Figure 1:
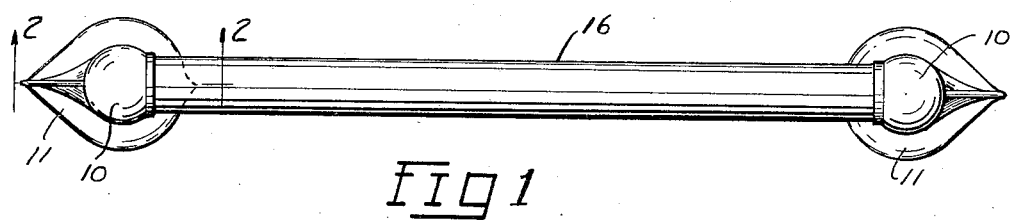

Dec. 13, 1949  J. BOZOTI  2,490,854
MEANS FOR FASTENING BRACKETS TO WALLS
Filed Dec. 23, 1947

INVENTOR
Joseph Bozoti
By Bates, Teare & McBean
Attorneys

Patented Dec. 13, 1949

2,490,854

UNITED STATES PATENT OFFICE 2,490,854

MEANS FOR FASTENING BRACKETS TO WALLS

Joseph Bozoti, Parma, Ohio

Application December 23, 1947, Serial No. 793,507

4 Claims. (Cl. 248—225)

This invention relates to a means for fastening brackets, such as bathroom fixtures and the like, to a wall. Illustrations of such brackets are holding devices for the ends of towel holding rods, toilet paper holders, soap dish holders, etc. The primary object of the invention is to provide a fitting adapted to be secured to the wall and so formed with relation to the bracket that when the bracket is firmly placed on the fitting it will be definitely and effectively secured to the wall and hold itself in place thereon during subsequent usage.

It is a further object of the invention to provide such fitting and bracket that the securement is effected without visible screws, bolts or other fastening devices, the base of the bracket, when mounted, entirely enclosing the fastening means.

It is a further feature of my securing device that while the bracket, once placed thereon, is effectively held in position for any normal use, the bracket may be removed by unusual stresses peculiarly applied thereto, for instance by giving the bracket a succession of infinitesimal movements back and forth, which finally accumulate to cause a sufficient looseness to enable removal of the bracket.

My invention by which I accomplish the above described results is illustrated in the drawing hereof and is hereinafter described in detail and the essential novel features are summarized in the claims.

Figure 2:
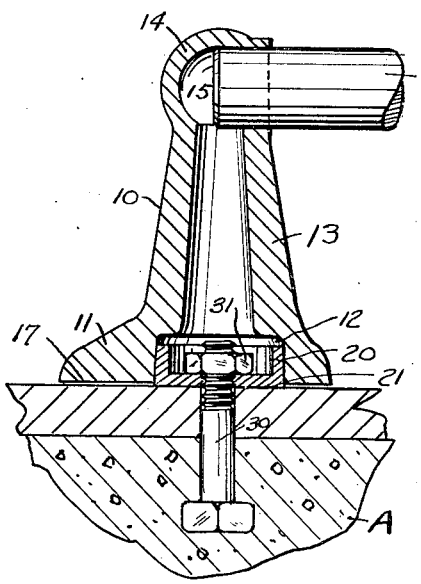
Figure 3:
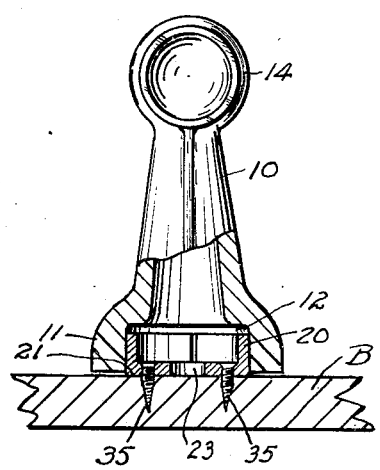
Figure 5:
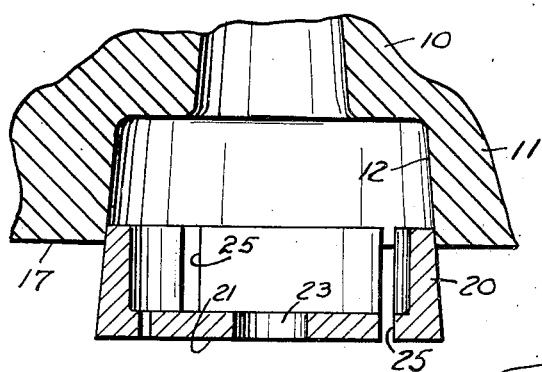
Figure 4:
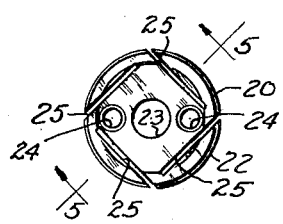

In the drawings, Fig. 1 is an elevation of a towel rack embodying two of my brackets which may be secured in place by my fastening means; Fig. 2 is an enlarged section through one of the brackets, in the longitudinal plane indicated by line 2—2 on Fig. 1, this view showing the fastening device secured by a bolt embedded in a cement wall; Fig. 3 is a sectional view at right angles to Fig. 2 showing the bracket in place against a wall of material adapted to receive wood screws for holding the fastening device thereon; Fig. 4 is a face view of the fastening device which is secured to the wall either by the bolt of Fig. 2 or the screws of Fig. 3; Fig. 5 is an enlarged view sectioned through the fastening device and the adjacent portion of the bracket to illustrate the action of the coacting tapers on such parts.

In the drawing 10 indicates a bracket adapted to carry the towel rod, soap dish or some other member and 20 the fitting secured to the wall and coacting with the bracket to hold the same in place.

As shown, the bracket is a hollow member which is preferably of metal though it may be of plastic or other material. It has an enlarged base portion 11 terminating in a smooth planular surface 17 adapted to stand close to the wall as shown in Figs. 2 and 3. From this base a shank 13 leads to a suitable terminal portion 14 varying with use to which the bracket is to be put. The portion 14 is shown as of approximately spherical form having a lateral opening 15 in which the ends of a towel rod 16 may be mounted. In the enlarged base 11 of this bracket is a recess 12 with its peripheral surface slightly flaring outwardly, or toward the base surface 17.

The fastening device 20 as illustrated comprises a cup-shaped member having a flat base 21 adapted to snugly engage the wall surface and having an annular rim 22 tapered inwardly at the same angle as the recess 12 in the bracket tapers outwardly, so that the outer periphery of the fitting may make a snug fit with the bracket as the latter is forced into place by direct pressure toward the wall.

The fitting 20 is held in place by suitable attaching means accessible within the cup portion of the fitting. As shown in Fig. 2, I secure the fitting by a bolt 30 which is embedded in a cement wall A and passes through a central opening 23 in the fitting and carries a nut 31. In Fig. 3, I have shown the fitting attached to a piece of wooden trim B by wood screws 35. The fitting may be attached to plaster or the like by the usual toggle bolts. In any case the fitting is secured by screw-threaded means to the wall in position to receive the bracket which is held thereon frictionally.

In place of relying solely on the snug taper fit between the fitting and bracket, I prefer to make the fitting resilient to cause it to maintain lateral pressure against the wall of the recess in the bracket. To effect this resilience, I make the fitting of resilient material and form one or more slots or notches 25 therein, leading through the rim thereof and through part of the base to enable the rim to be slightly compressed.

I prefer to provide several of the notches 25, four being shown in Fig. 4. The notches are preferably located equidistantly about the fitting and lie in symmetrical relationship and are so positioned as to avoid the openings 23 and 24 through the base of the fitting. The angle of the notches will govern the amount of compression obtainable in the fitting. I prefer to employ straight slots parallel to symmetrically located tangents to the rim of the fitting.

When the fitting is of resilient material, as spring steel for example, and has one or more of the notches 25 as described, the smallest external diameter of the unapplied fitting is just slightly smaller than the largest internal diameter of the recess in the bracket, as illustrated in Fig. 5. Accordingly, when such fitting has been secured to the wall, the bracket may be readily located in registration with it and by suitable force in shoving the bracket toward the wall, the fitting being thereby radially compressed and thereafter reacting laterally to maintain a very firm hold on the bracket.

When the bracket has been once shoved into place on the fitting so that the flat face of the bracket face comes substantially against the flat surface of the wall the bracket remains in position permanently. However, while the bracket appears to actually engage the wall, the sizes of the fitting and the recess are so chosen that there is a very slight space between the flat base and the wall, as indicated in exaggerated form in Figs. 2 and 3. This space allows a very slight tipping action of the bracket with reference to the wall. This enables the removal of the bracket by first pressing it in one direction then in the opposite direction back and forth gradually loosening it by increments which are hardly noticeable but which finally accumulate sufficiently to enable the withdrawal of the bracket from the fitting.

It will be understood from the above description that while it is possible to remove the bracket from the wall without in any manner injuring the bracket or disturbing the fitting, no such action takes place in the ordinary use of the bracket and it remains permanently in the position in which it is originally mounted until it is intentionally removed. Also, the frequency of the removal of the bracket will have no appreciable effect on the contact surfaces of either the bracket or the fitting.

I claim:

1. Means for fastening brackets to walls comprising a fitting adapted to be secured to the wall and having a rim and a bracket having in its base a recess the bounding surface of which may snugly engage the exterior of the rim, at least one of such contacting surfaces being slightly converging in a direction away from the wall, the transverse dimension of said recess being slightly less than the corresponding dimension of the fitting, whereby movement of the bracket toward the wall may force the rim radially inward.

2. A means for fastening brackets to walls comprising a fitting having a base adapted to be secured to a wall and having an annular rim, and a plurality of slits of substantial length extending through the rim and adjacent portions of the base to enable the fitting to be distorted, whereby a bracket having a recess in its base may be snugly mounted on the fitting.

3. Means for fastening brackets to walls comprising a cup-shaped fitting having a flat base adapted to abut the wall and having an annular rim, a plurality of slits each extending through the rim and continuing through the adjacent portion of the base and terminating in the base adjacent the next slit therein, to enable the fitting to be distorted and an opening through the base of the fitting enabling the passage of a securing member.

4. Means for fastening brackets to walls comprising a fitting having a round rim interrupted by several equidistant slits, said slits continuing in straight lines in the base of the fitting, each to a region adjacent the next slit in the base whereby the rim and base may be distorted to enable snug engagement with the wall of a recess in the bracket.

JOSEPH BOZOTI.

REFERENCES CITED

The following references are of record in the file of this patent:

UNITED STATES PATENTS

| Number | Name | Date |
| --- | --- | --- |
| 789,390 | Smith | May 9, 1905 |
| 1,810,229 | Stirrup | June 16, 1931 |
| 1,940,888 | Smith | Dec. 26, 1933 |